(12) United States Patent
Finke et al.

(10) Patent No.: US 10,894,724 B2
(45) Date of Patent: Jan. 19, 2021

(54) MAINTENANCE SELF-DIAGNOSIS AND GUIDE FOR A SELF-CONTAINED WASTEWATER TREATMENT SYSTEM

(71) Applicant: California Institute of Technology, Pasadena, CA (US)

(72) Inventors: Cody E. Finke, Seattle, WA (US); Clement A. Cid, La Canada, CA (US); Michael R. Hoffmann, South Pasadena, CA (US); Anastasia K. Hanan, Pasadena, CA (US); Donald Harvey Pinkston, III, Pasadena, CA (US); Michael Christopher Vanier, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 460 days.

(21) Appl. No.: 15/204,829

(22) Filed: Jul. 7, 2016

(65) Prior Publication Data
US 2017/0008775 A1    Jan. 12, 2017

Related U.S. Application Data

(60) Provisional application No. 62/190,173, filed on Jul. 8, 2015.

(51) Int. Cl.
*C02F 1/00* (2006.01)
*C02F 3/00* (2006.01)
(Continued)

(52) U.S. Cl.
CPC .............. *C02F 1/008* (2013.01); *C02F 3/006* (2013.01); *C02F 1/46* (2013.01); *C02F 3/28* (2013.01);
(Continued)

(58) Field of Classification Search
CPC .... C02F 1/008; C02F 1/46; C02F 1/28; C02F 3/006; C02F 3/28
See application file for complete search history.

(56) References Cited

U.S. PATENT DOCUMENTS 6,119,125 A * 9/2000 Gloudeman .............. G06F 8/20
7,424,399 B2    9/2008 Kahn et al.
(Continued)

FOREIGN PATENT DOCUMENTS

WO    2004028974 A2    4/2004
WO    2008002608 A2    1/2008
(Continued)

OTHER PUBLICATIONS

Thomas, Shane, International Search Report and Written Opinion, PCT/US2016/041378, dated Sep. 22, 2016.
(Continued)

*Primary Examiner* — Catherine T. Rastovski
(74) *Attorney, Agent, or Firm* — Gavrilovich, Dodd & Lindsey LLP (57) ABSTRACT

A self-diagnostic maintenance system for wastewater treatment employs unique environmental sensor configurations to link operational states of a water treatment system with unique failure modes of the system. Upon detection of failure modes, the maintenance system alerts users and operators via a short messaging service (SMS) of the problem, and can display step-by-step pictorial repair instructions for the operator to replace broken or malfunctioning parts, without the operator needing to diagnosis the problem or understand the detailed workings of the wastewater treatment system.

19 Claims, 7 Drawing Sheets

(51) Int. Cl.
*C02F 1/46* (2006.01)
*C02F 3/28* (2006.01)
*C02F 103/00* (2006.01)

(52) U.S. Cl.
CPC .. *C02F 2103/005* (2013.01); *C02F 2209/006* (2013.01); *C02F 2209/008* (2013.01); *C02F 2209/02* (2013.01); *C02F 2209/04* (2013.01); *C02F 2209/06* (2013.01); *C02F 2209/11* (2013.01); *C02F 2209/22* (2013.01)

(56) References Cited

U.S. PATENT DOCUMENTS

| | | | |
|---|---|---|---|
| 9,123,189 B2* | 9/2015 | Kollgaard | G06Q 50/00 |
| 2010/0332149 A1* | 12/2010 | Scholpp | C02F 1/008 |
| | | | 702/25 |
| 2011/0257788 A1 | 10/2011 | Wiemers et al. | |
| 2013/0188046 A1* | 7/2013 | Kong | G05B 23/0272 |
| | | | 348/143 |
| 2015/0058129 A1* | 2/2015 | Nevid | G06Q 30/0269 |
| | | | 705/14.64 |

FOREIGN PATENT DOCUMENTS

| | | | |
|---|---|---|---|
| WO | WO 2008/002608 | * | 3/2008 |
| WO | 2013090407 A2 | | 6/2013 |
| WO | 2014058825 A1 | | 4/2014 |
| WO | WO 2014/058825 | * | 4/2014 |

OTHER PUBLICATIONS

Nickitas-Etienne, Athina, International Preliminary Report on Patentability and Written Opinion, PCT/US2016/041378, dated Jan. 18, 2018.

Schiller, Ben, "This Gates-Funded Toilet of the Future is Built So Anyone Can Repair It", Jun. 23, 2015, https://www.fastcompany.com/3047460/this-gates-funded-toilet-of-the-future-is-built-so-anyone-can-repair-it.

* cited by examiner

MAINTENANCE SELF-DIAGNOSIS AND GUIDE FOR A SELF-CONTAINED WASTEWATER TREATMENT SYSTEM

CROSS REFERENCE TO RELATED APPLICATIONS

The present Application for Patent claims priority to Provisional Application No. 62/190,173; entitled "Self-Diagnosis and Maintenance Guide for Non-Served Sanitation Systems," filed Jul. 8, 2015, and hereby expressly incorporated by reference in its entirety as though set forth fully herein.

TECHNICAL FIELD

The disclosure relates to sewage treatment in general and particularly to maintenance systems and methods for human and domestic waste treatment systems.

BACKGROUND

The UN estimates that in ten years population growth and climate change will force 1.8 billion people into absolute water scarcity on the Falkenmark Indicator (FI), meaning there will not be enough runoff or water storage in certain regions to support basic human activity (i.e., less than 500 $m^3$ of water/capita/year (Amber Brown 2011)). Additionally, by 2025, according to the UN estimates, two thirds of the world's population will be forced into water stress on the FI, meaning there will not be enough water to support economic growth (i.e., less than 1700 $m^3$ of water/capita/year (Amber Brown 2011)) (Falkenmark 1989, UNWWAP 2015). Such water scarcity will almost exclusively occur in the developing world where reverse osmosis or other water desalination and recycling methods are not feasible due to financial or infrastructure constraints. It is estimated that more than 1.8 billion people will get sick and millions of people will prematurely die from, out of necessity, drinking water polluted with their own waste or from simply not having enough water.

Economic growth in these regions will further stagnate as industries ranging from manufacturing to farming to mineral extraction will struggle to operate without sufficient water, compounding health and environmental damage. Beyond the direct anthropocentric problems associated with water scarcity, when there is not enough water to sustain human life, all the water tends to be siphoned away from the other species of the world causing myriad ecological crises. This can already be witnessed across the globe: the keystone riparian habitats of the now dry Lake Chad and Colorado River Delta are just two of many examples. Given that the world population is unlikely to stabilize until sometime after 2100 (Gerland, Raftery et al. 2014) and given that the effective residence time of $CO_2$ in the atmosphere is about 400 years (Lam 2003), the problem of water scarcity will likely become worse for at least a century before it begins to get better. Therefore, novel water management strategies and solutions that can feasibly be implemented in the developing world are needed for these billions of people and ecosystems.

Solutions fit for the developed world do not always translate to solutions for the water crisis in the developing world; a key consideration in the developing world is finding infrastructure-free wastewater treatment and recycling systems. Desalination, water catchment, and wastewater recycling technologies are all relatively affordable in developed countries because the massive water and wastewater grid infrastructures required for these technologies already exist. This is why, for example, the people of the American Southwest feel almost no effect of the recent four year drought despite population growth in all Southwest states exceeding the national average of 9.6% between 2000 and 2010, in many cases by a factor of 2 or 3 (EPA 2015). This is also why Israel and Saudi Arabia are experiencing almost no water scarcity despite being countries that are over 60% desert.

The situation in developing countries is very different; there is little to no existing water grid infrastructure and the commercially-available water recycling and desalination technologies are fiscally prohibitive. As such, new and innovative water management solutions need to be created for the developing world.

While water in developing regions is occasionally scarce because it is missing, it is more often scarce because it has been contaminated with human waste due to no or poor sanitation facilities (Snyder 2015). Sanitation (defecating, urinating, and body washing) is generally water costly. In highly water scarce and impoverished regions, one study found that on average sanitation accounted for 69% of personal water use (Gleick 1996). In other words, for the 1.8 billion people that may be in absolute water scarcity by 2025, poorly managed toilet wastewater will be a predominant problem, and a management plan that involves water recycling for sanitation will be important to preserving human and ecological health. Therefore, it has become a major focus of the water resource technology field to find inexpensive and infrastructure-free or low infrastructure ways to eliminate water consumption due to sanitation and also treat wastewater in the developing world.

New technology suitable for the developing world is under research, but it generally cannot be delivered without infrastructure engineering. Two and a half billion people across the developing world lack access to any type of improved sanitation facility (WHO 2014). Therefore, in order to realistically conserve water in the developing world it is desirable to develop inexpensive, non-sewered sanitation (not connected to convention sewer infrastructure) technologies that recycle their water.

To this end, certain technologies have been developed. Success, in this technical field, is defined as technology that recycles toilet wastewater at a cost of less than five U.S. cents/user/day, excluding maintenance costs, and do not require grid water, sewer, or electricity. For example, researchers at California Institute of Technology have developed an electrochemical water treatment and toilet system for home or small public spaces. This affordable systems can recycle wastewater for sanitation purposes without any grid infrastructure and therefore have the potential to secure sustainable water resources for nearly one third of the world's human population and many other ecosystems.

Unfortunately, these technologies standing alone are prohibitively expensive when maintenance costs are included. The maintenance issue in the developing world is well characterized. In 2003, Harvard International Development Professor L. Pritchett and World Bank Development Researcher M. Woolcock attempted to determine the reason why most aid efforts are unsuccessful. They concluded that for technology-based solutions, a dearth of highly skilled workers in the developing world leads to a lack of maintenance on aid projects, in turn leading to rapid depreciation of the use value of the aid technology (Pritchett and Woolcock 2004). In one case, field testing water treatment technology in India, due to a lack of highly educated technicians, three minor equipment failures could not be diagnosed by the Indian workers on treatment systems. This led to a non-operating time of greater than 50% of the year and maintenance costs—almost exclusively plane tickets and travel expenses—of greater than $50,000. This means that repair costs alone increased the cost of the system by nearly 140 fold/day/person.

SUMMARY

Delivering lasting and critical water treatment and recycling technology to the developing world needs a solution to the problem of maintenance infrastructure. The techniques disclosed herein offer a simple, flexible, universal, affordable, and fast solution to this problem. With this new technology, a sustainable water future may finally be possible in the developing world.

A solution to the problem of system maintenances should be simple, adaptable to many diverse treatment technologies, universally available, inexpensive, and quick. The World Bank estimates that as of 2014 there are 96.3 mobile phone subscriptions per 100 people in the world. In other words, there is likely at least one working phone with a skilled phone operator in every community everywhere on earth (WorldBank 2015).

Disclosed herein is a technology that capitalizes on mobile communications networks to diagnose water treatment maintenance issues and guide unskilled maintenance engineers to fixing problems with non-sewered water treatment technologies. Self-diagnosis works in these treatment systems because the problem of water treatment is constrained and readily monitored, especially as the water should only be sterile, odorless, and clear to recycle for sanitary purposes, not necessarily potable.

Therefore, as disclosed herein, the maintenance problem becomes one of monitoring water quality, which can be measured many ways, including but not limited to, with clarity and turbidity sensors, by monitoring oxidant production, which can be measured with current, pH, temperature, and oxygen content, and by monitoring pathogen content which can be measured using the previous measures combined. The foregoing measurements are examples, and other measurement parameters may be used. Other maintenance issues may be a matter of assessing mechanical and electrical failures of a given system.

In accordance with an aspect of the disclosed techniques, a self-diagnostic maintenance system for a self-contained wastewater treatment system includes a data logger, a controller, and a communication interface. The data logger is configured to gather data from sensors mounted on the self-contained wastewater treatment system. The controller is configured to compare the data to threshold values to determine whether a failure mode of the self-contained wastewater treatment system exists. The communication interface is configured to send a message through a communication network to alert a maintenance operator of the failure mode.

In accordance with a further aspect of the disclosed techniques, a method of maintaining a self-contained wastewater treatment system includes: gathering data from sensors mounted on the wastewater treatment system, comparing the data to threshold values to determine whether a failure mode exists, and sending a message through a wireless communication network to alert a maintenance operator of the failure mode of the wastewater treatment system.

The foregoing summary does not define the limits of the appended claims. Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

As used herein and in the appended claims, the singular forms "a," "and," and "the" include plural referents unless the context clearly dictates otherwise. Thus, for example, reference to "a sensor" includes a plurality of such sensors and reference to "the pipe" includes reference to one or more pipes known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

The following detailed description, which references to and incorporates the drawings, describes and illustrates one or more specific examples of self-diagnostic maintenance methods and systems for self-contained wastewater treatment systems. These systems and methods, offered not to limit but only to exemplify and teach what is disclosed, are shown and described in sufficient detail to enable those skilled in the art to practice the disclosed techniques. Thus, where appropriate to avoid obscuring the inventive techniques, the description may omit certain information known to those of skill in the art.

The word "exemplary" is used throughout this application to mean "serving as an example, instance, or illustration." Any system, method, device, technique, feature or the like described herein as "exemplary" is not necessarily to be construed as preferred or advantageous over other features.

Figure 1:
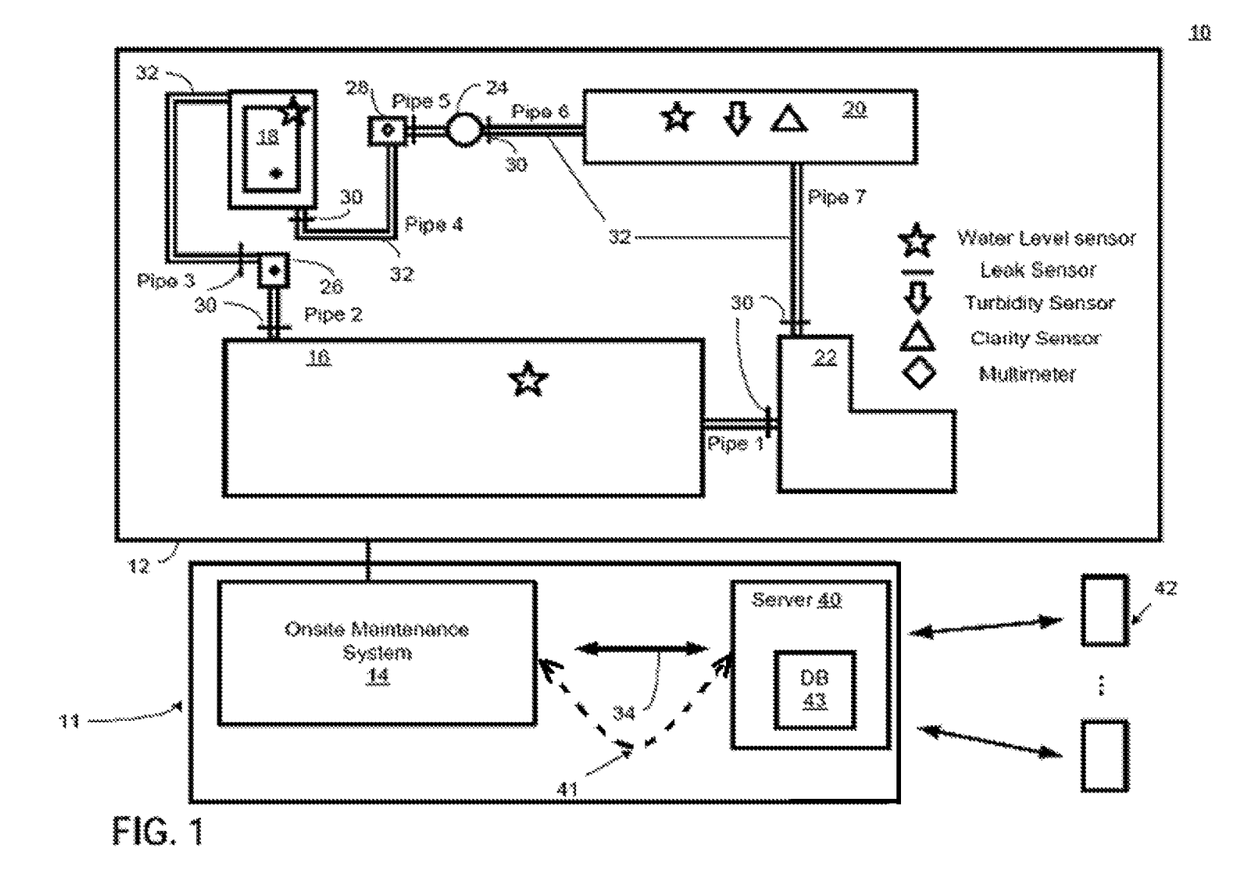
FIG. 1 is a conceptual diagram illustrating an example of a self-diagnostic maintenance system included with a self-contained, electrochemical wastewater treatment system.

FIG. 1 is a conceptual diagram illustrating an example of a self-contained, self-diagnosing wastewater treatment system 10. The system 10 includes a maintenance system 11 in combination with a self-contained, electrochemical wastewater treatment system 12. The maintenance system 11 may include an onsite maintenance system 14 and a server 40 storing one or more databases 43. The server 40 communicates with the onsite maintenance system 14 by way of a computer network 34, such as a local area network (LAN), a wireless LAN, the Internet, a combination of different networks, or the like. The server 40 also communicates with one or more end user or operator wireless communication devices 42. The wireless communication devices 42 can include any suitable wireless mobile devices, such as a laptop, smartphone, personal digital assistant (PDA), cell phone, or the like.

A communication network 41, including at least communication links between the onsite maintenance system 14, the server 40, and wireless communication devices 42, permits the onsite maintenance system 14 to alert toilet users and maintenance operators and engineers of problems with the wastewater treatment system 12.

The wastewater treatment system 12 includes a toilet 22, an anaerobic bioreactor tank 16, an electrochemical reactor unit or tank 18, a treated clean water holding tank 20, pumps 26, 28 and filter 24. Water pipes 32 (pipe 1, pipe 2, pipe 3, pipe 4, pipe 5, pipe 6, pipe 7) connect and permit water and waste flow between the various components of the treatment system 12. Leak sensors 30 are mounted to each section of pipe 32 for detecting water leaks. The wastewater treatment system 12 may be the wastewater treatment technology described in U.S. patent application Ser. No. 14/048,163, filed Oct. 8, 2013, entitled "Self-Contained, PV-Powered Domestic Toilet and Wastewater Treatment System," which is incorporated herein by reference in its entirety.

Figure 2:
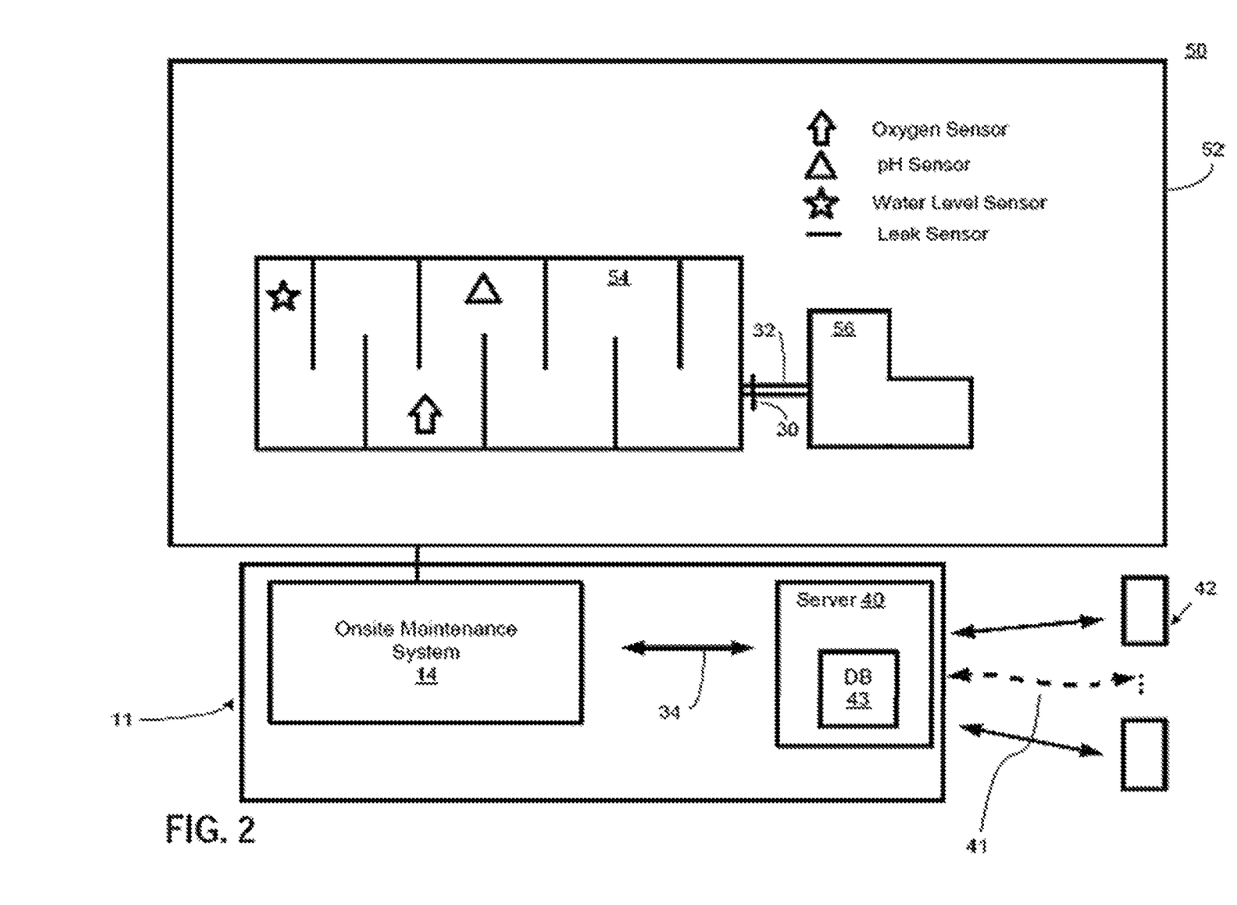
FIG. 2 is a conceptual diagram illustrating an example of a self-diagnostic maintenance system included with a self-contained, anaerobic bioreactor wastewater treatment system.

In order to self-diagnose, various wastewater relevant sensors are placed in the self-contained wastewater treatment system 12. FIG. 1 shows a sensor configuration that works with an electrochemical self-contained water treatment technology; and FIG. 2 shows a sensor configuration with an anaerobic bioreactor system 52. Other sensor configurations are possible, and in particular, they are possible for other types of self-contained water treatment systems (biochar, supercritical reactor, and the like), and the principles outlined here apply in the same or similar ways.

The sensor configuration in a wastewater treatment system, such as system 12, may be as follows: each pipe has a leak sensor (conductivity sensor), each tank has a water level sensor (mechanical level sensor), every electronic component in the system, including pumps, has a voltmeter and an ammeter, all water tanks have level sensors, and treated water has the requisite water quality sensors to determine if treatment is happening. Fluid pressure sensors may also be used. For example, the electrochemical system 12 may have a clarity and a turbidity meter or sensor for monitoring water quality installed to determine if the electrodes and filter 24 are working properly, respectively. An anaerobic bioreactor (e.g., system 52 of FIG. 2) may instead have a pH sensor and an oxygen meter (sensor) installed to measure overall water quality by ensuring that the proper reactions and biological communities exist.

Other sensors that may be included in a wastewater treatment system and monitored may include one or more air quality sensors, specific gas sensors, magnetic sensors, oxidation/reduction potential sensors, chlorine sensors, voltage sensors, current sensors, light sensors, for example a single wavelength light sensor, and any suitable combination of the sensors disclosed herein.

In the example sensor configuration of FIG. 1, commercially-available sensors are used. For example, a Ponsel Digisens™ turbidity sensor from Fondriest Environmental, Inc. may be used in the clean water tank; a PAR clarity sensor from Apogee Instruments may be used on the clean water tank; three LVU30 ultrasonic level sensors from Omega™ Engineering may be used, one each on the clean water, electrochemical reactor, and anaerobic bioreactor tanks; seven leak sensors 30 may each be a GS3 ruggedized soil moisture sensors (one mounted on each pipe); and three L10002DCA4 ammeters from Laurel® Electronics and three L10002DCV4 voltmeters from Laurel® Electronics may be used (one each on the two pumps 26, 28 and the electrodes 18). This sensor configuration is shown in FIG. 1. The sensors may use any suitable communication protocol to allow the system to be flexible, for example, the following communication protocols would work for the previously listed sensors: clarity sensors: USB-CDC; turbidity, ammeter, and voltmeter sensors: modbus; water level sensors: rs485, and leak sensors: SDI-12.

The wastewater treatment maintenance system 11 operates generally as follows. The onsite maintenance system 14 monitors sensors in the waste treatment system 12. As described above, each pipe 32 has a leak sensor 30, each tank has a water level sensor, every electronic component in the treatment system 12 including the electrodes 18 has an ammeter and voltmeter, treated water has clarity and turbidity sensors, and then each system has an oxidant production sensor.

In order to allow for the repair of the system components, data from sensors in uploaded to an onboard controller 102 (FIG. 3) of the onsite maintenance system 14. These data are then converted into a Boolean array based on comparison to a threshold value array. The threshold value array contains threshold values respectively corresponding to each of the sensors. If at least one error value is found in the Boolean array, the controller 102 determines the mode of system failure based on the position of the false arguments in the Boolean array. The failure modes are ensured to be finite and discrete by using replacement as the only repair method for a failed component. For example, if a mouse chews through a wire or an impeller breaks, the failure mode is pump failure and it is fixed by replacement of the pump. This keeps the repairs feasible for an unskilled technician and the maintenance software nearly exhaustive of all possible failure scenarios.

Once a unique failure mode is identified by the onsite system 14, the system 14 notifies the server 40, which in turn sends a text message using a short message service (SMS) to the operator notifying her that the system 12 is broken, and that the operator should attend to the system 12 as soon as possible. Similarly, the system will send an SMS text to the users of the treatment system 12 notifying them that the system 12 is broken and identifying other toilets to use while the system 12 is being fixed. This creates a "wastewater recycling smart grid" where even in the absence of sewers there is never a time where people will need to resort to open defecation or non-recycled water for their sanitation needs.

Figure 7:
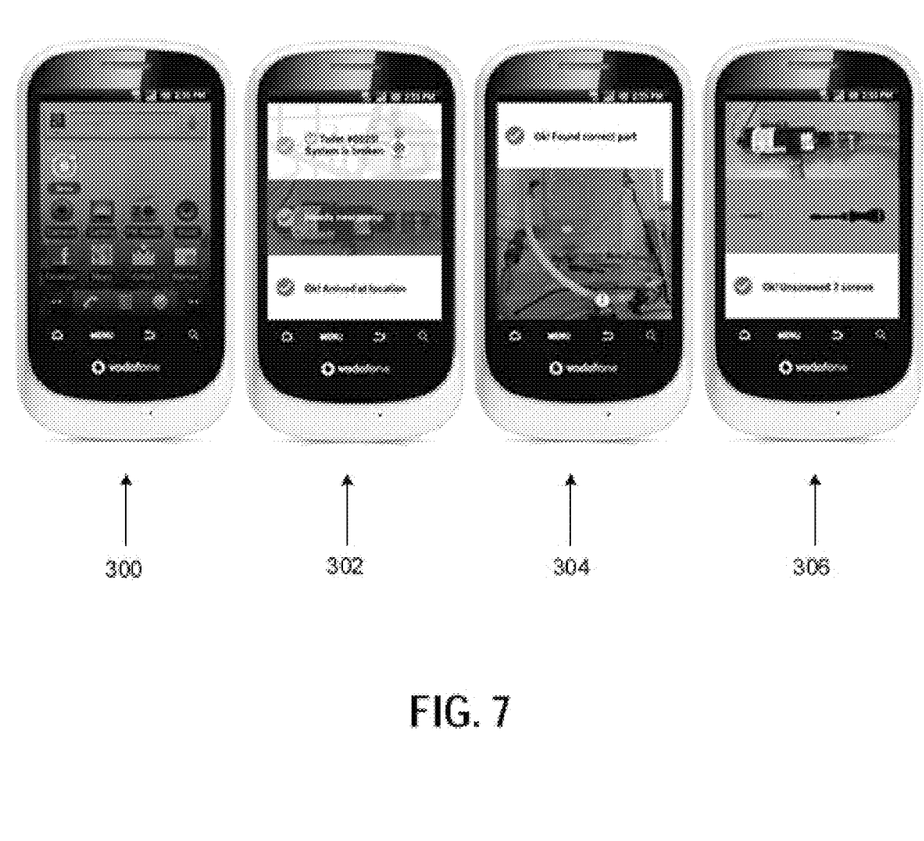
FIG. 7 illustrates examples of information that can be generated by the maintenance system and displayed at maintenance operators' wireless mobile devices.

Once the operator arrives at the broken treatment system 12, he/she will go to the onsite display (FIG. 3 display 106) and see a series of step-by-step instructions on how to replace the broken part(s) and get the system 12 running again. Or, if the operator has a smartphone (a recent Pew Research Center poll suggests smart phone use now represents a significant and rapidly increasing number of phone users across the developing world) the operator can view the repair instructions on a smartphone application (example images generated by this application are shown in FIG. 7). The instructions may be a series of pictorial instructions showing a picture of the system 12 with the part indicated, showing which part in needed, and showing how to replace that part.

Once the part has been replaced, the operator, using her wireless mobile device, tells the maintenance system 11 that the repairs are complete. The system 11 then does a test cycle, and if everything is fixed, the system sends SMS messages to the users, informing them the system 12 is back in order. Finally, if the system 12 is not fixed, the maintenance system 11 will continue self-diagnosis until it is fixed. If a problem persists after multiple calls to replace a part, the system 11 automatically escalates the issue and sends an SMS to a field engineer to look at the system 12 in appropriate depth.

A problem with self-diagnosing technologies is sensor failure before system component failure. The maintenance system 11 addresses this issue in two ways. First, sensors will be installed in duplicate in physically distinct locations on the system 12 such that if one sensor gets physically damaged, the second sensor will likely still be functional. Then if the two sensors are reading significantly different values, the operator will be instructed to replace both sensors. The second safety check may be routine, automated "dry runs" where a water free short run of the system 12 is conducted which, if sensors are working properly will trigger universal failure signals. If any sensor fails to give a failure signal, it will be replaced. A clean water run using water from the treated water tank may alternatively/also be performed to check sensor validity.

In order to communicate between treatment system 12 and operators handsets 42, the server 40 is used and contains SQL tables or databases (DB) 43. The tables are described below in connections with FIG. 6. The tables contain information to uniquely match toilets (wastewater treatment systems) to their caretakers (maintenance operators), uniquely identify toilets and caretakers, and store status codes and data about why a sensor failure is stored. As described herein, under normal running conditions, a toilet will send an "I'm OK" signal to the server 40 on a regular basis, such as an hourly basis. This is done to reduce data sent across the communication network, for example, a cellular network, while also to making sure that the treatment system is functioning.

If a system does not send an "I'm OK" message to the server 40 for a predefined time, for example, the minimum time allowed by the buffering capacity of the wastewater treatment system, such as a 24 hour period, then a "no Internet" failure code message may be sent out to a maintenance engineer. If the system 11 reports a failure code instead of the "I'm OK" signal, then that code as well as the preceding 24 hours of sensor data gathered by the maintenance system 11 is sent and stored in the server 40. The server 40 then sends an SMS message to the maintenance operator or engineer with instructions on how to reach the toilet. It may also send an SMS to all registered users of the toilet to inform them that this toilet is broken and to let them know of other nearby toilets to use. For a prototype version, the server 40 used gmail's SMTP server to send SMS messages via email to SMS gateways. The server 40 operations were set up using the Python™ Flask package as well as the SQL databasing language. The server 40 may also include a software application for a user interface to assign, edit, and delete operators, engineers and users to and from treatment systems using html.

An example list of possible failure modes of system 12 and corresponding actions required by the maintenance operator or engineer for the system 10 of FIG. 1 is given below.

I. Leaks/Breakages:
The operator should replace the following item:
1) Anaerobic Bioreactor Tank (ABRT), If [(ABRT water level sensor is on) and (Pipe 1 leak sensor is off) and (pump 1 ammeter is off)]
2) Electrochemical Reactor Tank (ECRT), If [(ECRT water level sensor is on) and (Pipe 3 leak sensor is off) and (Pipe 4 leak sensor is off) and (pump 2 ammeter is off)]
3) Clean Water Tank (CWT) If [(ABRT water level sensor is on) and (Pipe 4 leak sensor is off) and (Pipe 5 leak sensor is off)]
4) Toilet (TT), If [(TT water level sensor is on) and (Pipe 1 leak sensor is off)]
5) Pipe 1, If (pipe 1 leak sensor goes on)
6) Pipe 2, If (pipe 2 leak sensor goes on)
7) Pipe 3, If (pipe 3 leak sensor goes on)
8) Pipe 4, If (pipe 4 leak sensor goes on)
9) Pipe 5, If (pipe 5 leak sensor goes on)
10) Pipe 6, If (pipe 6 leak sensor goes on)
11) Pipe 7, If (pipe 7 leak sensor goes on)

II. Electronic Failures:
The operator should replace the following item:
13) Pump 1, If [(Pump 1 voltmeter is on) and (Pump 1 ammeter is off)]
14) Pump 2, If [(Pump 3 voltmeter is on) and (Pump 2 ammeter is off)]
15) Electrodes in ECRT, If [(Electrode voltmeter is on) and (Electrode ammeter is off)]

III. Treatment Failures:
The operator should replace the following item:
16) Electrodes, If (clarity sensor data falls below threshold)
17) Filter, If (turbidity sensor data falls below threshold)

FIG. 2 is a conceptual diagram illustrating another example of a self-contained, self-diagnostic wastewater treatment system 50. The system 50 includes the maintenance system 11 in combination with a self-contained, anaerobic bioreactor wastewater treatment system 52. The maintenance system 11 includes the same functions and components described in connection with FIG. 1, but the system 11 of FIG. 2 is configured to operate with the anaerobic bioreactor wastewater treatment system 52 instead of the electrochemical unit 12.

The anaerobic bioreactor wastewater treatment system 52 includes a baffled waste holding/treatment tank 54 with a water pipe 32 connecting the tank 54 to a toilet 56.

The treatment system 52 has an oxygen meter to ensure respiration was depleting the oxygen of the system and a pH meter to ensure the fermentation was not occurring without methanogenesis. Additionally, the system may include a thermocouple and oxygen meter to ensure temperatures were being reached in the presence of oxygen. All of these sensors are commercially available.

Figure 3:
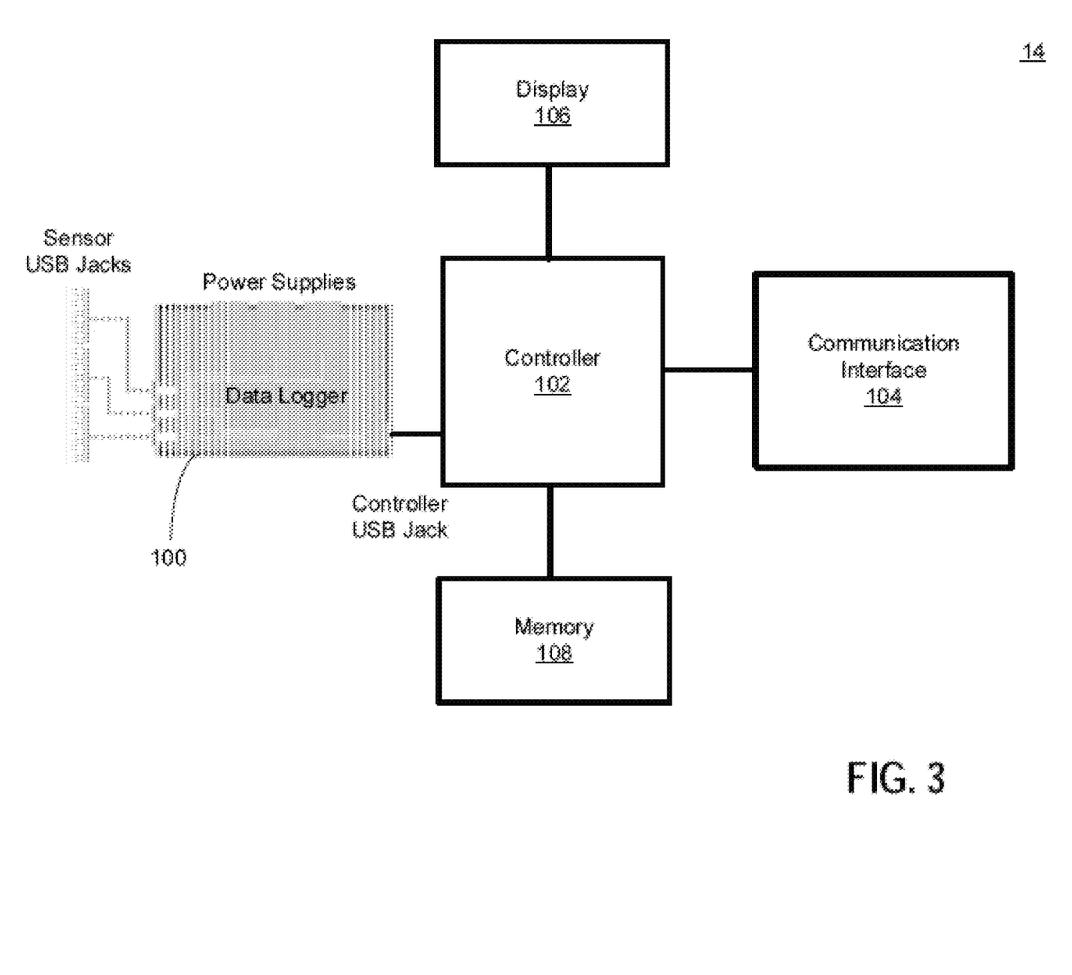
FIG. 3 is a block diagram illustrating certain components of an example onsite maintenance system usable with the wastewater treatment systems shown in FIGS. 1 and 2.

FIG. 3 is a block diagram illustrating certain exemplary components of the onsite maintenance system 14 of the wastewater treatment systems shown in FIGS. 1 and 2. The onsite maintenance system 14 may include a data logger 100, a controller 102, a display 106, a memory 108, and a communication interface 104.

The data logger 100 may be any suitable electronic device configured to gather data from the sensors mounted on the self-contained wastewater treatment system 12 or 52. Power for the different sensors is provided as needed via power supplies included in the data logger 100 that are connected, for example, to USB ports or jacks connected to the sensors. The example data logger printed circuit board (PCB) shown in FIG. 3 includes three power supplies providing 5 and 12 volt DC. There are two 5 volt power supplies to accommodate the multimeters, which measure current and voltage. These power supplies are connected to three 10-way USB jacks for sensor input. These jacks are included in the data logger 100, which also includes a controller USB jack, which can connect to a computer with display screen (e.g., the controller 102).

The sensor USB ports connect the sensors to the data logger 100, which logs the current data value from each sensor, and each time a new data value is recorded the data logger 100 uploads all the data points that represent the current state of the treatment system to the controller 102. The data logger 100 may have built-in circuits that operate at the voltages of common waste water treatment sensors, this is so the same chip can be used for most systems. The data logger 100 may include multiple USB ports for communicating with the controller 102.

The controller 102 may be any suitable electronic device that is configured to compare the uploaded, logged sensor data to threshold values to determine whether a failure mode of the self-contained wastewater treatment system exists. The controller 102 may include an onboard computer that stores the most recent data entry from the data logger 100 and its time point. For example, the controller may include a programmable processor, such as one or more microprocessors, and memory storing programming code executable by the processor(s) to perform the functions and operations described herein.

The controller 102 may store the previous data entries, for example, 999 entries, and time points. The controller 102 compares the data entries (as an array) to an array of threshold error values and generates a Boolean array. If any false values are found in the Boolean array, the location of the value(s) tells the controller 102 how the system 12 or 52 failed. The controller 102 then triggers the appropriate maintenance guide to be sent to a maintenance operator. Further details of the controller 102 operation are described below.

The controller 102 may also/alternatively perform arithmetic operations on the sensor data, such as, but not limited to: averaging the data, computing a minimum or a maximum value in a data set, and then comparing the resultant data (e.g., averaged data value, minimum data value, or maximum data value) against one or more defined threshold values or a previous logged data set to generate associated Boolean values that may also/alternatively be included in the Boolean array.

The display 106 may be any suitable display device for displaying information to a person. For example, the display 106 may be a LCD that is controlled by the controller 102. In order to minimize data sent via the server 40, the treatment systems 12, 52 are set up with instructional repair images preloaded onto them, for example, storing in memory 108. If a failure code is triggered, the onsite maintenance system 14 may automatically load and display the proper repair instruction on display 106 so that they are ready when the operator arrives to fix the system.

The communication interface 104 may be any suitable data communication interface or bus that is configured to send a message through the communication network 41 to alert a maintenance operator of the failure mode by way of the server 40.

Figure 4:
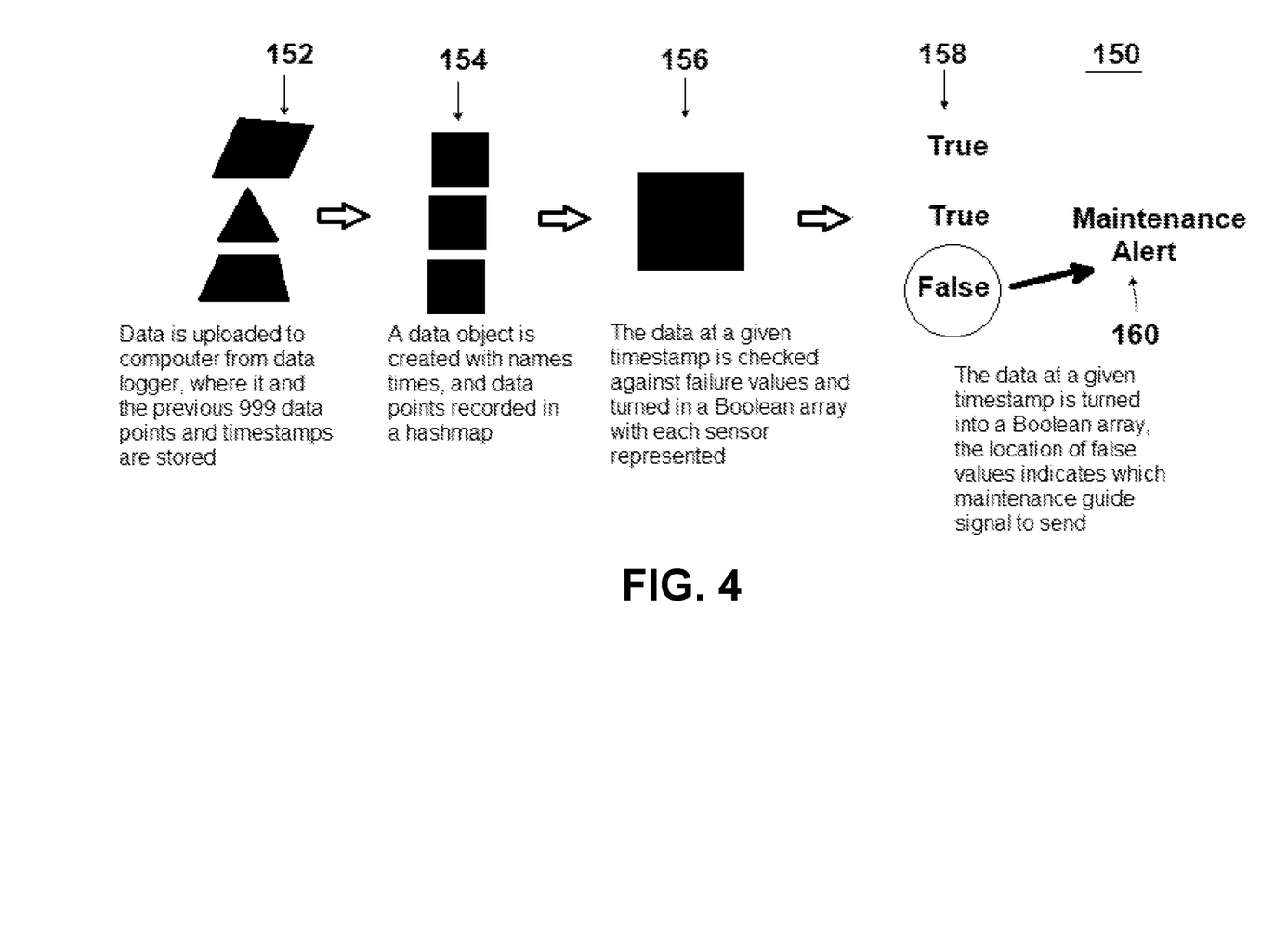
FIG. 4 is a process diagram illustrating an example method that can be executed by the maintenance system of FIG. 3 to detect failure modes of a wastewater treatment system.

FIG. 4 is a process diagram 150 illustrating an example method that can be executed by the onsite maintenance system 14 to detect failure modes of a wastewater treatment system. In blocks 152, data is uploaded to the controller 102 from the data logger 100, where it and the previous 999 data points and timestamps are stored. In blocks 154, the controller 102 creates a data object with names, times, and data points recorded in a data structure, such as a hashmap, dictionary, or the like. In blocks 156, the data at a given timestamp is checked against failure values and turned in a Boolean array with each sensor represented. In blocks 158, the data at a given timestamp is turned into a Boolean array, the location of false values indicates which maintenance guide signal to send. In step block 160, the maintenance alert is communicated to the maintenance operate by way of the communication network 41 and server 40.

Figure 5:
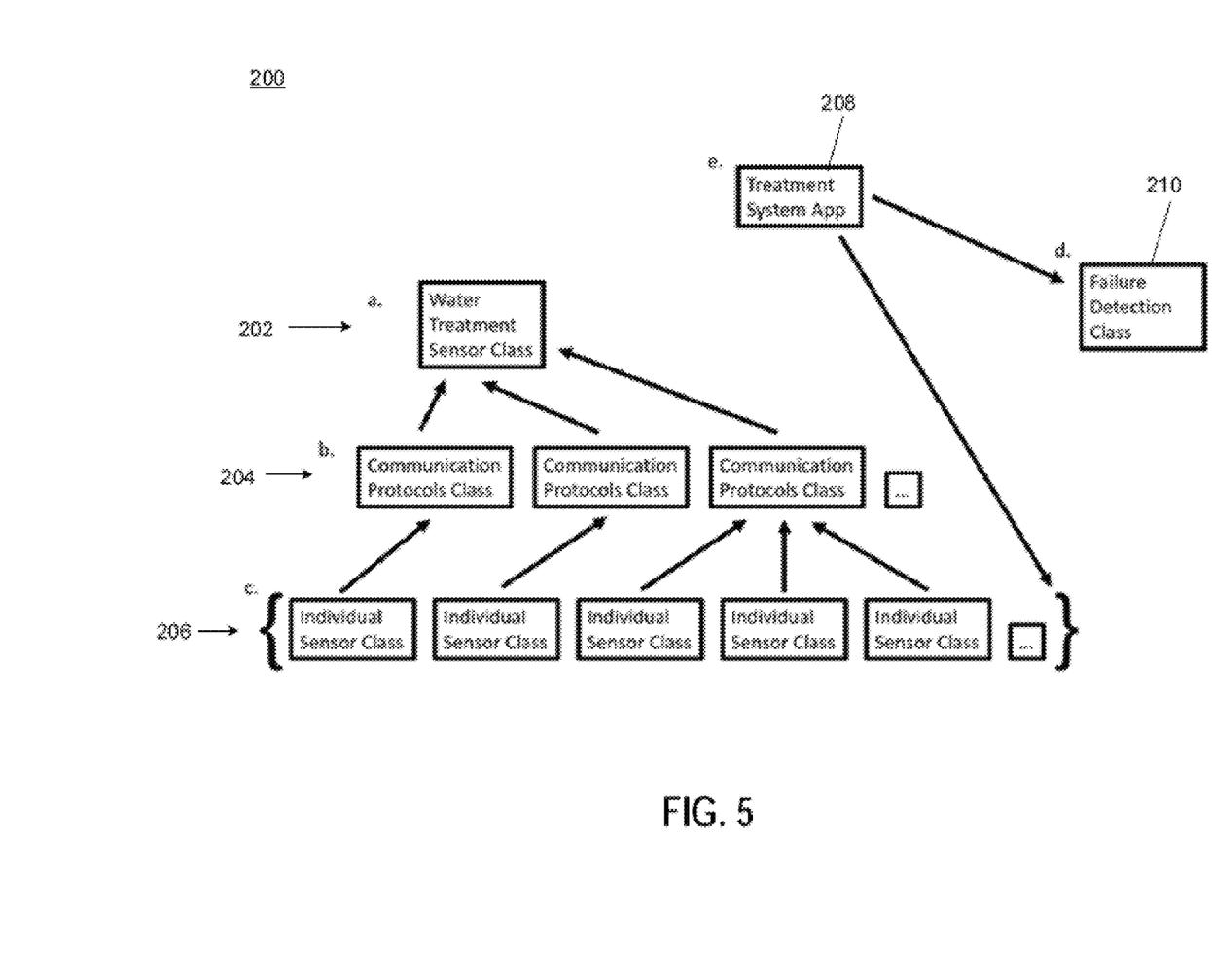
FIG. 5 is an object diagram describing examples of a self-diagnostic/maintenance software application and classes of the maintenance system of FIG. 3.

FIG. 5 is a block diagram 200 describing examples of self-diagnostic maintenance software application and object classes of the onsite maintenance system 14. The object classes are hierarchically organized and include a water treatment sensor class 202, one or more communication protocols classes 204, and one or more individual sensor classes 206. A treatment system software application 208 is executable by the onsite maintenance system controller 102. The application 208 uses the classes 202, 204, 206, as well as the failure detection class 210.

This scheme shown in FIG. 5 describes how the onsite maintenance system software communicates with the treatment system 12 or 52 and diagnoses failures. The arrows shown in FIG. 5 point toward the class that is imported and away from the class that is importing.

The water treatment sensor class 202 defines all the methods and variables that are common to any water treatment sensor software object. For example, how much data is stored, the units of the data, a method to average the data, and the time that the data was measured.

There are multiple communication protocol classes 204, which each import the water the treatment sensor class 202 and define the methods and variables that are necessary to communicate with a particular sensor. The sensors of a wastewater treatment system can use different communications interfaces, and a communication protocol class can be provided each. For example, there could be a Modbus class which defines methods to read registers for sensor using a Modbus interface; and there could be a USB-CDC class which defines serial commands based on the USB-CDC protocol for communicating with those sensors using a USB-CDC interface.

There are then individual sensor classes 206, which each define the methods to process data from particular sensors and define the commands that need to be sent to the sensor or decoded by the communication protocol class.

The foregoing class architecture allows for easy "plug and play" sensor installation where in order to install anew type of sensor, only a sensor class needs to be defined which imports the appropriate communication protocol class.

The self-diagnosis software code that is executed by the controller 102 is written to be as accommodating as possible to different communication protocols. The software may be written using the Python™ language as the main language, but in practice any suitable programming languages may be used. As described in FIG. 5, in order to create software that is functional across the many different sensors that may be available across the developing world, a subclass hierarchy is implemented. The superclass is the wastewater treatment sensor class 202 which defines the variables common to all sensors including a serial number, a dictionary of communication commands, units, the baud rate, the interval at which to send commands, a threshold number that would indicate a failed state of the particular sensor, and lists of a given length to store data and timestamps in. The super class 202 also includes methods such as a method to average data, a method to store data and time, a method to return the oldest record, and a method to return all the stored data.

Subclasses 204 of the water treatment sensor class 202 are communication protocol specific. In the example disclosed herein, communication protocols classes 204 may include subclasses for modbus, USB-CDC, SD-12, and rs485 communication protocols. These protocols classes 204 eliminate the need to write completely new communication system code for new sensors that are integrated into the system. Instead, only a new subclass needs to be written. Communication subclasses include variables unique to the sensor, for example, this may be a communication port, a timeout time, an address, or stop bits. The communication subclasses 204 all also contain a method to discover the communication port that the sensor is using and a method to read data from the sensor.

Each individual sensor is a subclass of the relevant communications class. The individual sensor classes 206 define variables unique to the specific sensor that are not common to the class of sensors that uses the same communication protocol. For example, calibration variables or other settings. Each sensor subclass also defines a method to process raw data into physically meaningful data (converting bytes into floats, or converting volts into absorbance for example). In summary, the sensor classes 206 are written so new sensors can be easily integrated without defining any sort of general content. These classes define a way to uniquely identify individual sensors by communication port and serial number and then ask them for data on command.

The final class that is defined as part of the diagnosis algorithm is a failure detection class 210. The failure detection class 210 is provided which analyses the aggregate sensor data and determines if the system is broken and how it is broken. Essentially, this class takes a list of sensors and a list of failure mode lists which are Boolean values in positions in a list corresponding to the state of the system. For example, if there are only two sensors in the system, turbidity and clarity, and if turbidity's state were defined as zero if the sensor read data <100 NTU, and one if the sensor read data>100 NTU, and clarity was defined as zero if the sensor read <10 abs and one if the sensor read>10 abs. So if either sensor state was one, then the system would be in a failure mode. Thus, in this example, the detected failures would take a list of sensors [turb, clan] and a list of failure modes [[0,1],[1,0],[1,1]] where the state corresponds the sensor in the sensor list so the first item in the failure mode list would be acceptable turbidity, but unacceptable clarity and so on.

The failure detection class 210 then defines two methods—a first method to take a list of sensor data and return their state, and a second method which takes the current lists of sensor states and checks them against all the possible failure modes. If the system is OK it returns an OK message and if the system is failed it returns a code that uniquely indicates which part needs to be replaced.

Finally, the treatment system application 208 provides the main run loop for the self-diagnosing software running on the onsite maintenance system 14. The failure mode code (treatment system application 208) executed by the controller 102 defines the main run sequence which first initializes instances of all the individual required sensors for self-diagnosis, puts them in a list, defines the possible failure mode for the particular treatment system that is operating, and then asks the server 40 for a unique toilet ID. The code causes the system to then loop through all of the different sensors periodically asking for data and then checking if there is a system failure. If the system is OK, it will send an OK message to the server 40 so that the server 40 can see that the toilet is online. If something is wrong, it will start sending error messages identifying the failure mode and sensor data to the server 40 until the system is fixed, and then it will return to sending "I'm OK" messages.

Figure 6:
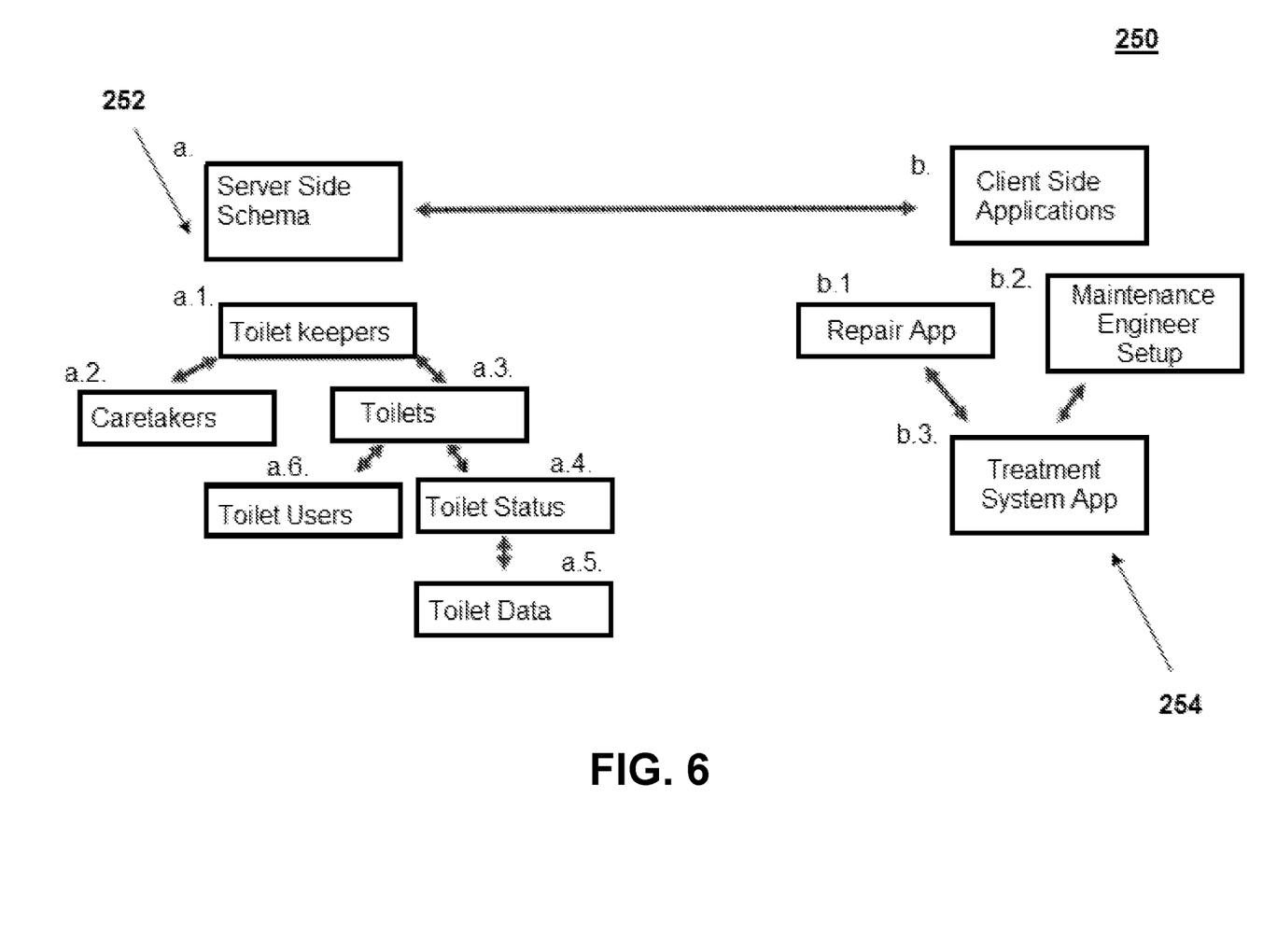
FIG. 6 is a scheme diagram illustrating example interactions between certain components of the maintenance system and the communication network.

FIG. 6 is a scheme diagram 250 illustrating example interactions between certain components of the maintenance system 11. The components are show in two groups—server side schema 252 and client side application 254. The scheme 250 shows how the self-diagnosing software executing on the maintenance system 11 and described in part in FIG. 5 interacts with a network of multiple wastewater treatment systems, operators, and users.

The server side schema 252 (box a) stores information to uniquely identify toilets (wastewater treatment systems), their operators, and their users. A table toilet_keepers (box a.1) stored on the server 40 links maintenance engineers (operators) and treatment systems. A "caretakers" table (box a.2), also stored on the server 40, lists individual maintenance engineers, names, phone numbers, and their IDs and is associated with toilet keepers using a primary key operator ID. The "Toilets" table (box a.3), stored at server 40, lists treatment systems and their locations, and is associated with the toilet_keepers table by primary key treatment system IDs. The "toilet_status" table (box a.4), stored on server 40, lists timestamped toilet statuses with primary key status IDs.

In operation of the maintenance system 11, a functioning treatment system reports an OK message to the server 40 once an hour. If a wastewater treatments system breaks, it will send its failure mode to the server 40, which is a failure status with a status ID. These data are stored in the toilet status table (box a.4), which is associated the toilets table (box a.3) by toilet IDs.

If a toilet breaks, it will send a failure mode code indicating how it broke. Along with the code, it sends toilet status data for a predefined prior period, for example, 24 hrs of data, which may be useful to an engineer as to why the given failure code occurred. These data are stored in the toilet_data table (box a.5), which is associated to toilet status by status_id and toilet_id.

The client side applications 254 sends and receives data to and from the server side 252 to allow maintenance engineers and operators to know when and how a treatment system is broken, and also alerts users of the toilet when to use an alternate toilet (box b). The client side applications 254 include software applications that execute of wireless communication devices of end users, maintenance operators, and/or maintenance engineers.

The repair application (box b.1) contains pre-loaded instructional content to minimize data that needs to be sent over the Internet from the server 40. When the repair application receives a failure code from the server 40 it will show the operator a series of instructional images indicating how which part to replace and how to replace it (see, for example, FIG. 7).

The maintenance engineer set-up application (box b.2) is a user interface to assign operator IDs to new maintenance engineers and to allow an individuals to pair operators with given toilets.

The treatment system application (box b.3) asks the server 40 to assign it one or more toilet IDs. The wireless communication device then receives information from the server concerning the statuses of the waste treatment systems associated with the toilet IDs. During operation, the treatment system monitors sensors data at a suitable frequency and periodically sends "I'm OK" messages to the server 40, for example, hourly. If the treatment system fails, it sends a failure codes to the server 40, which in turn, triggers repair actions based on the failure code. Among other things, the server 40 sends failure mode message alerts to end user, operator and engineer mobile devices associated with the assigned toilet IDs, in the event of a treatment system failure.

FIG. 7 illustrates examples of information that can be generated by the maintenance system and displayed at maintenance operators' wireless mobile devices. In response to a detected failure mode, the maintenance system 11 sends an alert to a maintenance operator's smart phone. Display 300 shows the notification of the alert on the smartphone in the upper left corner. By clicking on the notification, the maintenance operator can start the maintenance guide.

Upon starting the maintenance guide the smartphone next displays a map giving direction to the wastewater treatments system and indicates the part needed (display 302). If operator has no smartphone, an SMS of the wastewater system location may be sent instead, and the subsequent displays 304, 305 are shown on the treatment site onboard display 104 instead of the operator's phone.

Next, display 304 shows a picture of the wastewater treatment system with the part to be replaced indicated. In the example shown, a pump is indicated as needing replacement.

Display 306 shows the operator step-by-step directions about how to replace the failed part. After displaying the instruction, the application then prompts the operator to click a "finish" indicator. The finish indicator means that the operator has successfully completed the repair. It is transferred back to the onsite maintenance system 14 via the communication network 41. Upon receiving the finish indicator, the maintenance system 11 runs a self-test of the wastewater treatment system to ensure it is functioning properly.

The technology disclosed herein has been tested using bench scale partial models of the systems and sensors. For example, to determine the efficacy of the self-diagnosis system 11, an operator who was unacquainted with a treatment system was allowed to use the maintenance system 11 to determine what was wrong with the system and how to fix it. A lab scale prototype of a treatment system was provided that consisted of a pipe linking a treatment tank to a clean water tank. We then either made the clean water unclear, which triggered the clarity sensor and meant that the electrodes should be replaced, made the clean water tank turbid, which triggered the turbidity sensor and meant the filter should be replaced, or made the pipe leak, which triggered the leak sensor and meant the pipe should be replaced. We had spare parts available and had the unacquainted operator attempt to fix the broken system using only information from the self-diagnosing maintenance system. This demonstration resulted in repairs being made correctly 100% of the time for the failure modes tested.

Based on labor costs in India, it is estimated that this technology, installation included, may eliminate 99.7% of the current maintenance costs of grid-free water treatment technologies, and therefore, makes non-sewered sanitation technologies feasible for developing countries, cutting a clear path for ensuring sustainable water resources across the developing world.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or component for purposes of clarity, it should be understood that the techniques of this disclosure may be performed by any suitable combination of components or modules. Moreover, certain components, modules, or units are described in this disclosure to emphasize functional aspects of devices configured to perform the disclosed techniques, but do not necessarily require realization by different components. In some arrangements, functionality of various separate components described herein may be combined into a single device, or alternatively, provided by a collection of interoperative devices, including one or more processors as described above, in conjunction with suitable software and/or firmware.

In one or more examples, certain functions described herein may be implemented in hardware, software, firmware, or any suitable combination thereof. If implemented in software, the functions may be stored as one or more instructions or code on a computer-readable medium and executed by a hardware-based processing unit. Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

Instructions or code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits, including logic circuits and/or logic elements.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

Clearly, other embodiments and modifications will occur readily to those of ordinary skill in the art in view of the foregoing teachings. The above description is illustrative and not restrictive. The invention is to be limited only by the following claims, which are intended to cover such other embodiments and modifications when viewed in conjunction with the above specification and accompanying drawings. The scope of the invention should, therefore, be determined not with reference to the above description alone, but instead should be determined with reference to the appended claims along with their full scope of equivalents.

What is claimed is:

1. A self-diagnostic maintenance system for a self-contained wastewater treatment system, comprising:
    a plurality of sensors mounted on the self-contained wastewater treatment system, each of the plurality of sensors associated with a component of the wastewater treatment system;
    a data logger configured to gather data from the plurality of sensors; a controller, operatively coupled to the data logger;
    a memory operatively coupled to the controller;
    a software application, stored in the memory and executable by the controller, having:
        a plurality of hierarchically-organized sensor object classes, including
        a sensor object superclass that defines variables and methods common to all of the sensors, one or more communication protocol object subclasses each of the communication protocol object subclasses further defining variables and methods to communicate with one or more of the sensors using a predetermined communication protocol,
        one or more individual sensor object subclasses each of the individual sensor object subclasses further defining variables and methods to communicate with an individual sensor of the sensors, wherein the variables are unique to the individual sensor and are not common to other sensors in the system that use the same communication protocol as the individual sensor; and
        a failure detection object class that defines one or more methods to analyze data from the sensors to determine whether a failure mode exists in the system;
    a communication interface operatively coupled to the controller;
    a plurality of threshold values corresponding to each of the sensors stored in the memory for use by the software application in determining modes of system failure;
    wherein the software application, when executed by the controller, configures the controller to:
    upload the sensor data from the data logger;
    time stamp the uploaded sensor data;
    generate a data object consisting of the uploaded sensor data, time stamps and names recorded in a data structure;
    perform one or more arithmetic operations on the uploaded sensor data to produce resultant data;
    compare the resultant data against the plurality of corresponding threshold values to create a Boolean array of values, wherein each of the values in the Boolean array is associated with one of the sensors and indicates whether or not a failure mode of the self-contained wastewater treatment system has occurred, wherein each failure mode is associated with failure of one of the components of the wastewater treatment systems;
    wherein the communication interface is configured to send a message through a communication network to alert a maintenance operator of the failure model and
    wherein the system is configured to provide the maintenance operator with instructions for replacing or repairing the component of the wastewater treatment system that is associated with the failure mode, either by using an on-site display or by the message sent through the communication network.

2. The maintenance system of claim 1, wherein the controller is further configured to:
    select which message to send to the maintenance operator based on one or more false values appearing in the Boolean array.

3. The maintenance system of claim 1, further comprising a server configured to receive information from the communication interface and route the message to the maintenance operator.

4. The maintenance system of claim 3, wherein the server comprises:
    a database of information regarding a plurality of maintenance operators; and
    means for selecting one of the maintenance operators to be a recipient of the message, based on information stored in the database.

5. The maintenance system of claim 3, wherein the server comprises:
    a database of information regarding a plurality of self-contained wastewater treatment systems; and
    means for communicating with the self-contained wastewater treatment systems.

6. The maintenance system of claim 1, further comprising the sensors, wherein at least one of the sensors is selected from the group consisting of: a leak sensor, a water level sensor, a fluid pressure sensor, a turbidity sensor, a clarity sensor, a pH sensor, an oxygen sensor, an air quality sensor, a specific gas sensor, a magnetic sensor, an oxidation/reduction potential sensor, a chlorine sensor, a voltage sensor, a current sensor, light sensor, a single wavelength light sensor, and any suitable combination of the foregoing.

7. The maintenance system of claim 1, further comprising:
a memory storing instructional repair images.

8. The maintenance system of claim 1, further comprising a display configured to display repair instructions to the maintenance operator.

9. The maintenance system of claim 1, wherein the maintenance system is located at the self-contained wastewater treatment system.

10. The maintenance system of claim 1, wherein the controller is further configured to:
identify the sensors;
create a list of the identified sensors; and
define one or more failure modes of the self-contained wastewater treatment system based on the list of identified sensors.

11. A method of maintaining a self-contained wastewater treatment system larking a connection to a municipal wastewater treatment system, comprising:
gathering data, with a data logger. from a plurality of electrical and/or mechanical sensors mounted on the self-contained wastewater treatment system;
uploading the data from the data logger to a computer;
executing, on the computer, a software application having;
a plurality of hierarchically-organized sensor object classes, including
a sensor object superclass that defines variables and methods common to all of the sensors,
one or more communication protocol object subclasses, each of the communication protocol object subclasses further defining variables and methods to communicate with one or more of the sensors using a predetermined communication protocol,
one or more individual sensor object subclasses, each of the individual sensor object subclasses further defining variables and methods to communicate with an individual sensor of the sensors, wherein the variables are unique to the individual sensor and are not common to other sensors in the system that use the same communication protocol as the individual sensor; and
a failure detection object class that defines methods to analyze data from the sensors to determine whether a failure mode exists in the system;
the software application causing the computer to perform:
time stamping the uploaded data;
generating a data object consisting of the uploaded, time-stamped data;
performing one or more arithmetic operations on the uploaded data to produce resultant data; and
comparing the resultant data of the data object against a plurality of threshold values to create a Boolean array of values, wherein each of the values in the Boolean array is associated with one of the sensors, wherein if the resultant data falls above or below the threshold values then a failure mode has occurred;
identifying a repair instruction associated with the failure mode; and
sending a message through a wireless communication network to alert a maintenance operator of the failure mode and display the repair instructions to the maintenance operator.

12. The method of claim 11, further comprising:
selecting which message to send to the maintenance operator based on one or more false values appearing in the Boolean array.

13. The method of claim 11, wherein the message includes the location of the wastewater system.

14. The method of claim 11, further comprising:
identifying at least one replacement part to the maintenance operator.

15. The method of claim 11, further comprising:
receiving an input from the maintenance operator that the wastewater treatment system has been repaired; and
executing a self-test of the system in response to the input.

16. The method of claim 11, further comprising:
sending a second message through the wireless communication network to alert users of the wastewater system that the wastewater system is broken.

17. The method of claim 16, wherein the second message includes a location of the nearest working public toilet.

18. The method of claim 11, wherein at least one of the sensors is selected from the group consisting of: a leak sensor, a water level sensor, a fluid pressure sensor, a turbidity sensor, a clarity sensor, a pH sensor, an oxygen sensor, an air quality sensor, a specific gas sensor, a magnetic sensor, an oxidation/reduction potential sensor, a chlorine sensor, a voltage sensor, a current sensor, light sensor, a single wavelength light sensor, and any suitable combination of the foregoing.

19. The method of claim 11, wherein the wastewater treatment system is selected from the group consisting of an electrochemical unit and an anaerobic bioreactor unit.

* * * * *